(12) United States Patent
Mirjalali

(10) Patent No.: US 9,316,409 B2
(45) Date of Patent: Apr. 19, 2016

(54) HEAT EXCHANGER INCLUDING WASTE HEAT RECOVERY

(75) Inventor: Seyed Jafar Mirjalali, Aurora (CA)

(73) Assignee: ENERPRO INC., Cambridge, Ontario (CA)

( * ) Notice: Subject to any disclaimer, the term of this patent is extended or adjusted under 35 U.S.C. 154(b) by 322 days.

(21) Appl. No.: 13/587,414

(22) Filed: Aug. 16, 2012

(65) Prior Publication Data

US 2013/0042823 A1  Feb. 21, 2013

Related U.S. Application Data

(60) Provisional application No. 61/524,451, filed on Aug. 17, 2011.

(51) Int. Cl.
| | | |
|---|---|---|
| *F24H 1/16* | (2006.01) | |
| *F24H 8/00* | (2006.01) | |
| *F24H 9/14* | (2006.01) | |
| *F24D 17/00* | (2006.01) | |

(52) U.S. Cl.
CPC .............. *F24H 1/165* (2013.01); *F24H 8/00* (2013.01); *F24H 9/146* (2013.01); *F24D 17/0026* (2013.01); *F24D 2220/06* (2013.01); *Y02B 30/102* (2013.01)

(58) Field of Classification Search
CPC .......... F24H 1/165; F24H 8/00; F24H 9/146; F24H 1/403; F24H 1/406; F24H 1/43; Y02B 30/102; F24D 2220/06; F24D 17/0026; F22B 17/12

USPC ............... 432/29; 122/18.1, 49, 53, 68, 122, 122/235.23, 235.29, 235.15, 235.13, 122/235.32, 248

See application file for complete search history.

(56) References Cited

U.S. PATENT DOCUMENTS

| | | | | |
|---|---|---|---|---|
| 737,346 | A | * | 8/1903 | Chenhalls ...................... 122/248 |
| 2,645,210 | A | * | 7/1953 | Harris et al. .................. 122/248 |
| 3,529,579 | A | * | 9/1970 | Wanson ........................ 122/248 |
| 4,357,910 | A | * | 11/1982 | Blockley et al. .............. 122/248 |
| 7,334,542 | B2 | * | 2/2008 | Zorzit et al. ............. 122/235.19 |
| 2007/0209606 | A1 | * | 9/2007 | Hamada et al. .............. 122/18.1 |
| 2009/0025655 | A1 | * | 1/2009 | Tanaka et al. .............. 122/14.21 |

FOREIGN PATENT DOCUMENTS

| | | | | |
|---|---|---|---|---|
| FR | 1060488 | * | 4/1954 | |
| FR | 2565334 A1 | * | 12/1985 | ............. F24H 1/285 |

* cited by examiner

*Primary Examiner* — Steven B McAllister
*Assistant Examiner* — Steven Anderson, II
(74) *Attorney, Agent, or Firm* — Carlson, Gaskey & Olds, P.C.

(57) ABSTRACT

Disclosed is a heat exchanger, and a method for heating a working fluid. The heat exchanger includes a burner, a combustion section, and a condenser section positioned below the combustion section such that exhaust from the burner passes through the spiral coils and to the condenser. In an example of this disclosure, the combustion section includes a plurality of spiral coils radially spaced apart relative to one another, and the condenser section includes a plurality of U-bend coils.

13 Claims, 6 Drawing Sheets

HEAT EXCHANGER INCLUDING WASTE HEAT RECOVERY

RELATED APPLICATIONS

This application claims the benefit of U.S. Provisional Application No. 61/524,451 filed 17 Aug. 2011.

BACKGROUND

This disclosure relates to a heat exchanger, which may be a water boiler, including a waste heat recovery feature.

Heat exchangers are known to intake relatively cool water, and to heat that water using a variety of techniques. The heated water, which could be water vapor, may be used to heat potable water for in-home use, or to heat swimming pools, etc.

SUMMARY

Disclosed is a heat exchanger, and a method for heating a working fluid. The heat exchanger includes a burner, a combustion section, and a condenser section positioned below the combustion section such that exhaust from the burner passes through the spiral coils and to the condenser. In an example of this disclosure, the combustion section includes a plurality of spiral coils radially spaced apart relative to one another, and the condenser section includes a plurality of U-bend coils.

These and other features of the present disclosure can be best understood from the following drawings and detailed description.

BRIEF DESCRIPTION OF THE DRAWINGS

The drawings can be briefly described as follows.

DETAILED DESCRIPTION

Figure 1:
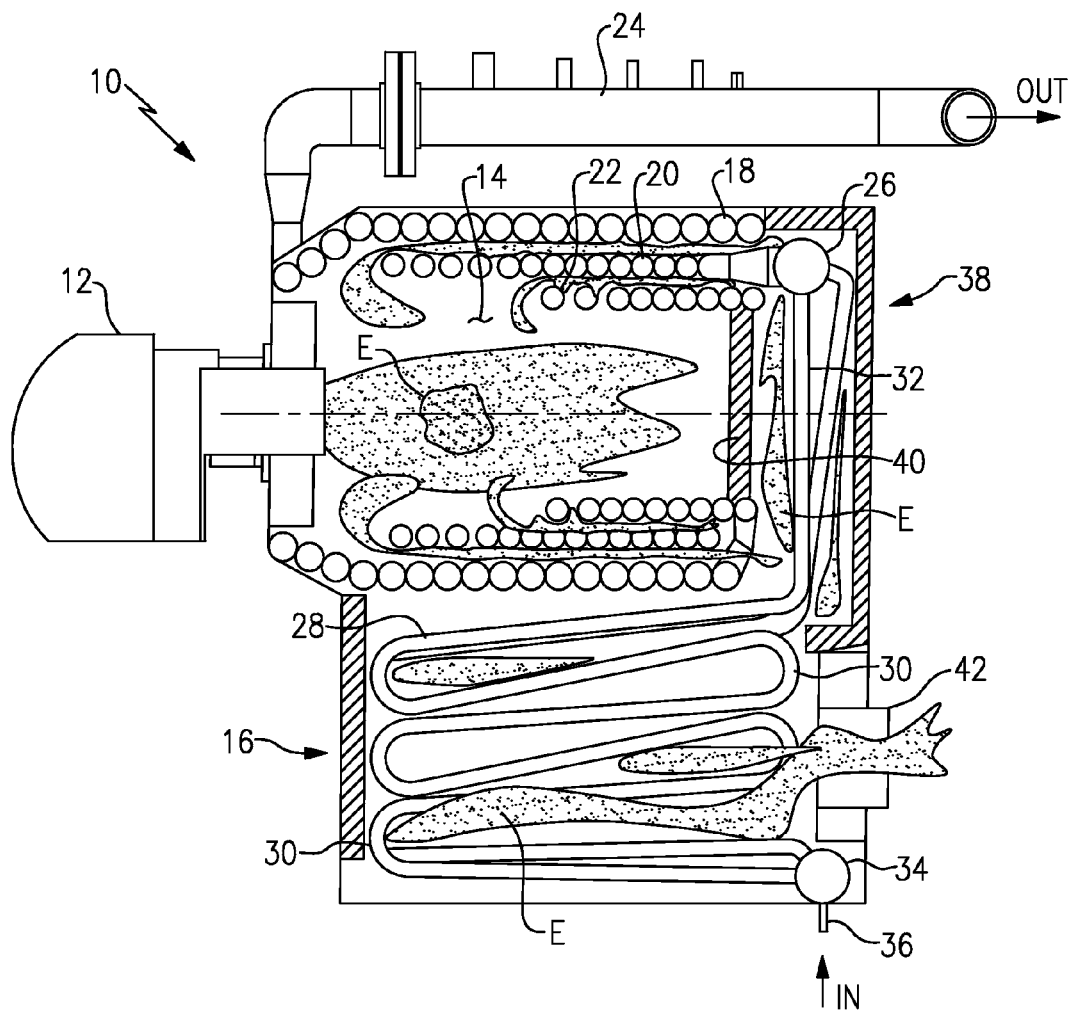
FIG. 1 is representative of the disclosed heat exchanger, and schematically shows the manner in which the exhaust from the burner passes through the spiral coils to a condenser.

FIGS. 1-6 show various views of an example heat exchanger 10, which in this example is a water boiler. The heat exchanger 10 includes a burner 12, a combustion section 14, and a condenser 16. While the shown heat exchanger 10 is a water boiler, this disclosure is applicable to other types of heat exchangers.

The burner 12 of the heat exchanger 10 is positioned adjacent a combustion section 14, which includes a plurality of concentric spiral coils 18, 20, 22. In one example, the spiral coils 18, 20, 22 are 1.75 inch (4.45 cm) diameter tubes, however the size of the tubes may vary. While the spirals coils 18, 20 and 22 are shown as being generally concentric, other arrangements are contemplated herein. Further, while three spiral coils (e.g., the spiral coils 18, 20 and 22) are shown, this number could be varied for a different heating effect.

The combustion section 14 and condenser 16 can be made of high grade stainless steel, for example. High grade stainless steel is particularly useful when the disclosed water heater is employed to heat potable water, because it provides a hygienic and healthy atmosphere. Stainless steel is also effective in transferring heat from the exhaust E to the water contained in the spiral coils 18, 20, 22 and condenser 16.

At one end, the spiral coils 18, 20, 22 communicate with an outlet pipe 24. At the other end, the spiral coils 18, 20, 22 are in communication with the condenser 16 by way of an upper manifold 26.

Figure 4:
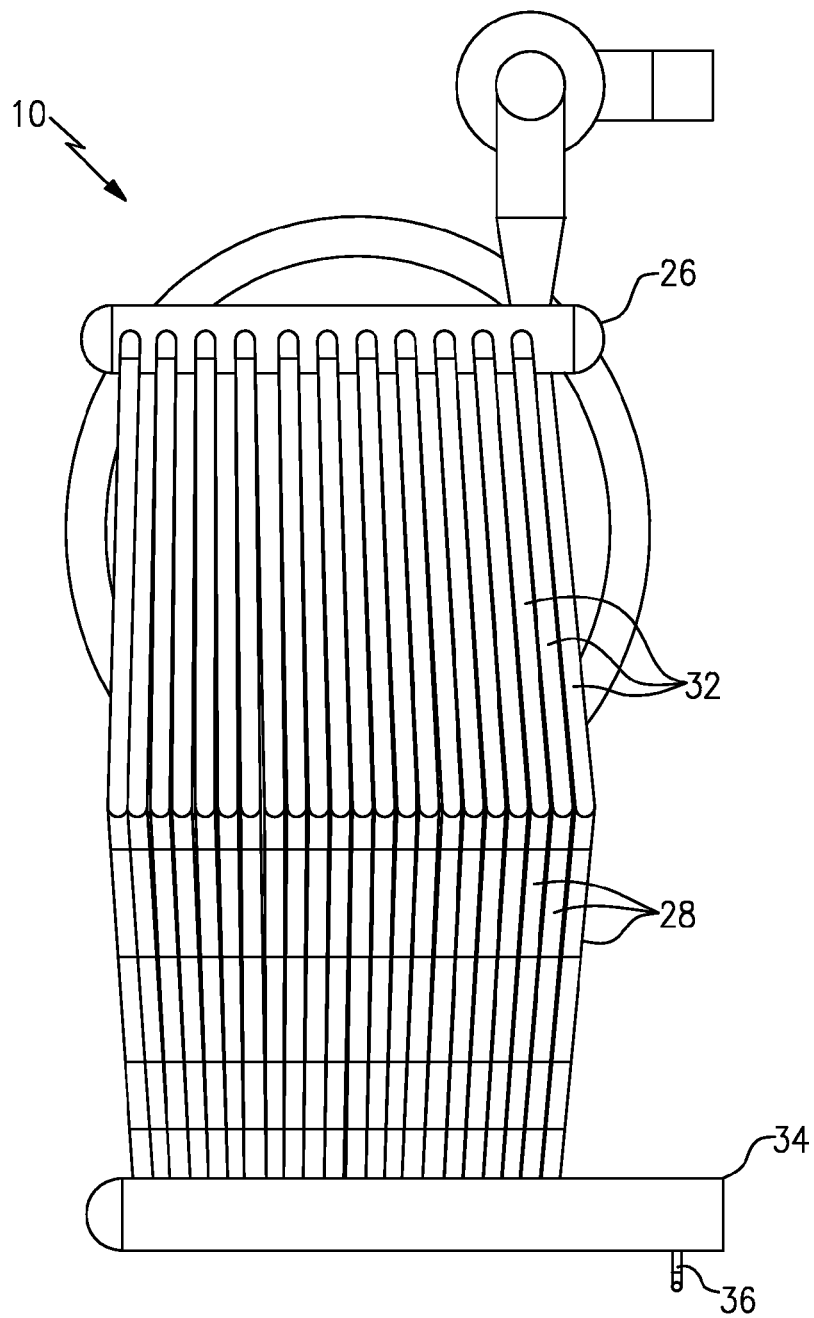
FIG. 4 is a rear view of the structure shown in FIG. 2.
Figure 5:
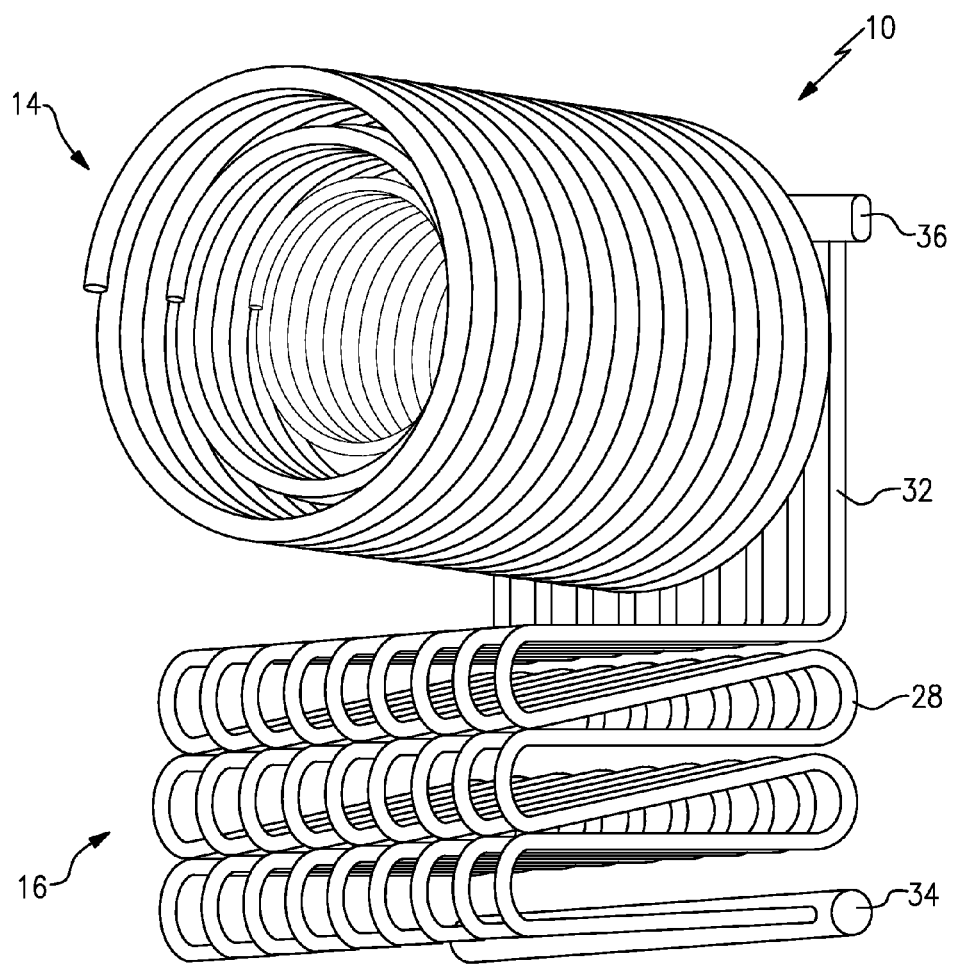
FIG. 5 is a perspective view of the structure shown in FIGS. 2-4.

In the illustrated example, the condenser 16 includes a plurality of U-bend coils 28, each including a plurality of U-bends 30. The U-bends 30 provide the condenser 16 with a relatively large surface area, while minimizing the overall space required for the condenser 16. In the example, the U-bend coils 28 include 1 inch (2.54 cm) diameter tubes. Each U-bend coil 28 is associated with a respective vertical pipe 32 to extend to the upper manifold 26, as shown in FIGS. 4-5, and each U-bend coil 28 also extends to a lower manifold 34, which is associated with a water inlet 36, seen in FIG. 3. As illustrated, in FIG. 5, the U-bend coils 28 can be arranged such that they are spaced apart from one another, to allow exhaust E to flow between adjacent U-bend coils 28.

Figure 6:
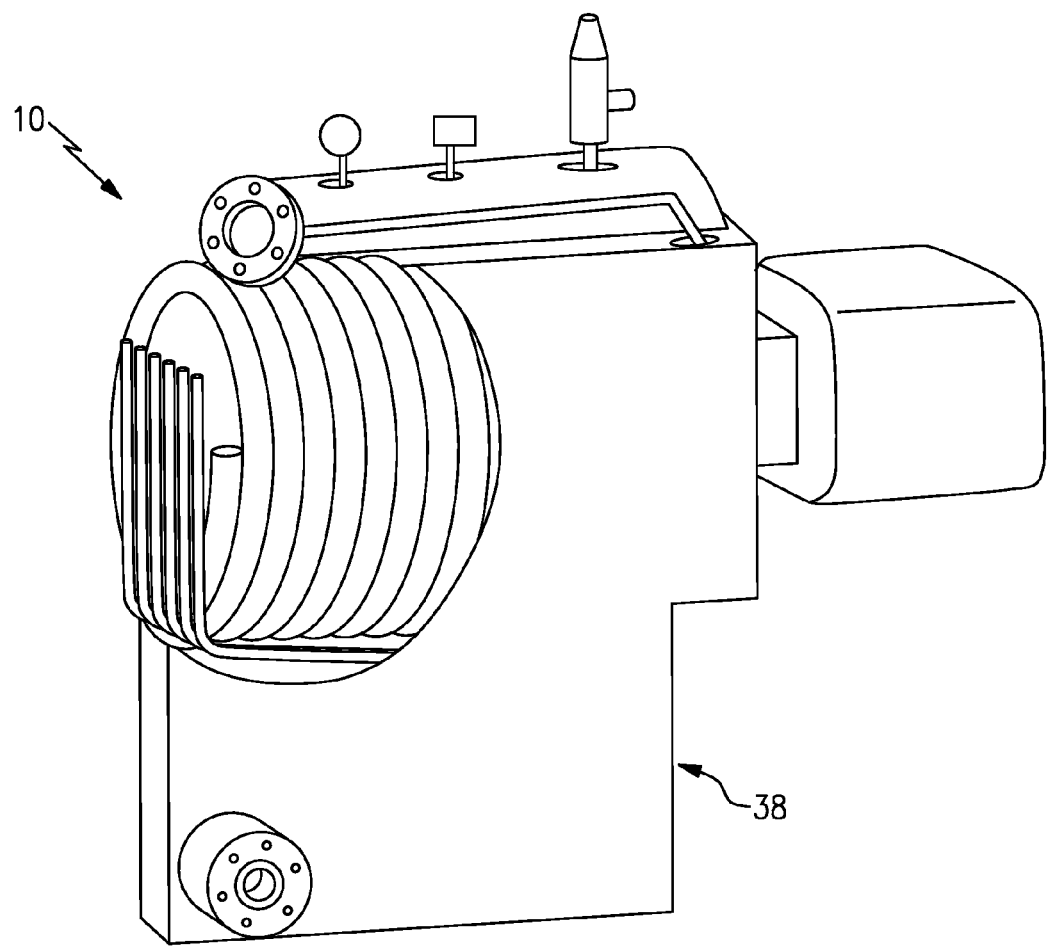
FIG. 6 is a perspective view of the structure from FIG. 5, as seen through a cut out in the housing.

The heat exchanger 10 is covered by a housing 38, which may include various internal plates 40 for directing the flow of exhaust E within the housing 38, as well as an outlet 42 for the exhaust E. The housing 38 is generally shown in FIGS. 1 and 6. FIGS. 2-5 show the disclosed heat exchanger 10 without the housing 38.

Figure 2:
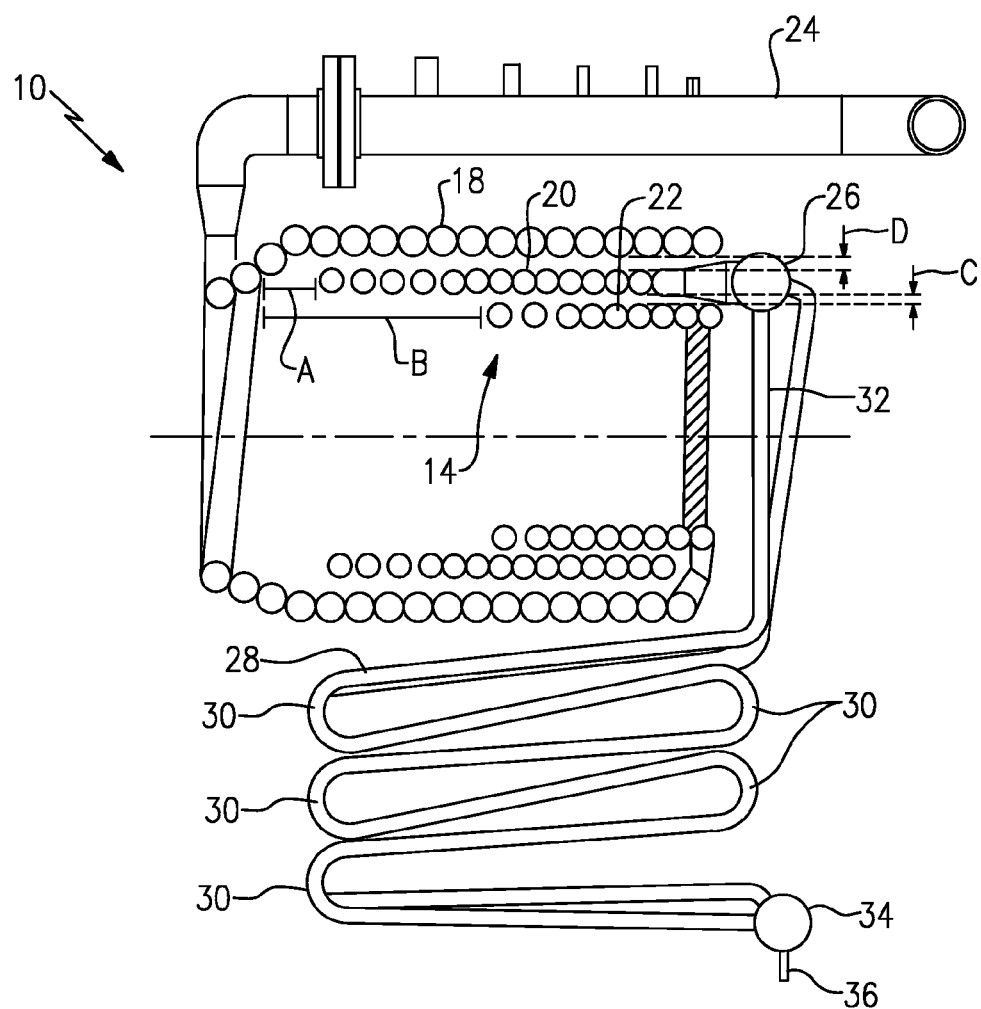
FIG. 2 is a representative view of the disclosed heat exchanger with the housing removed.
Figure 3:
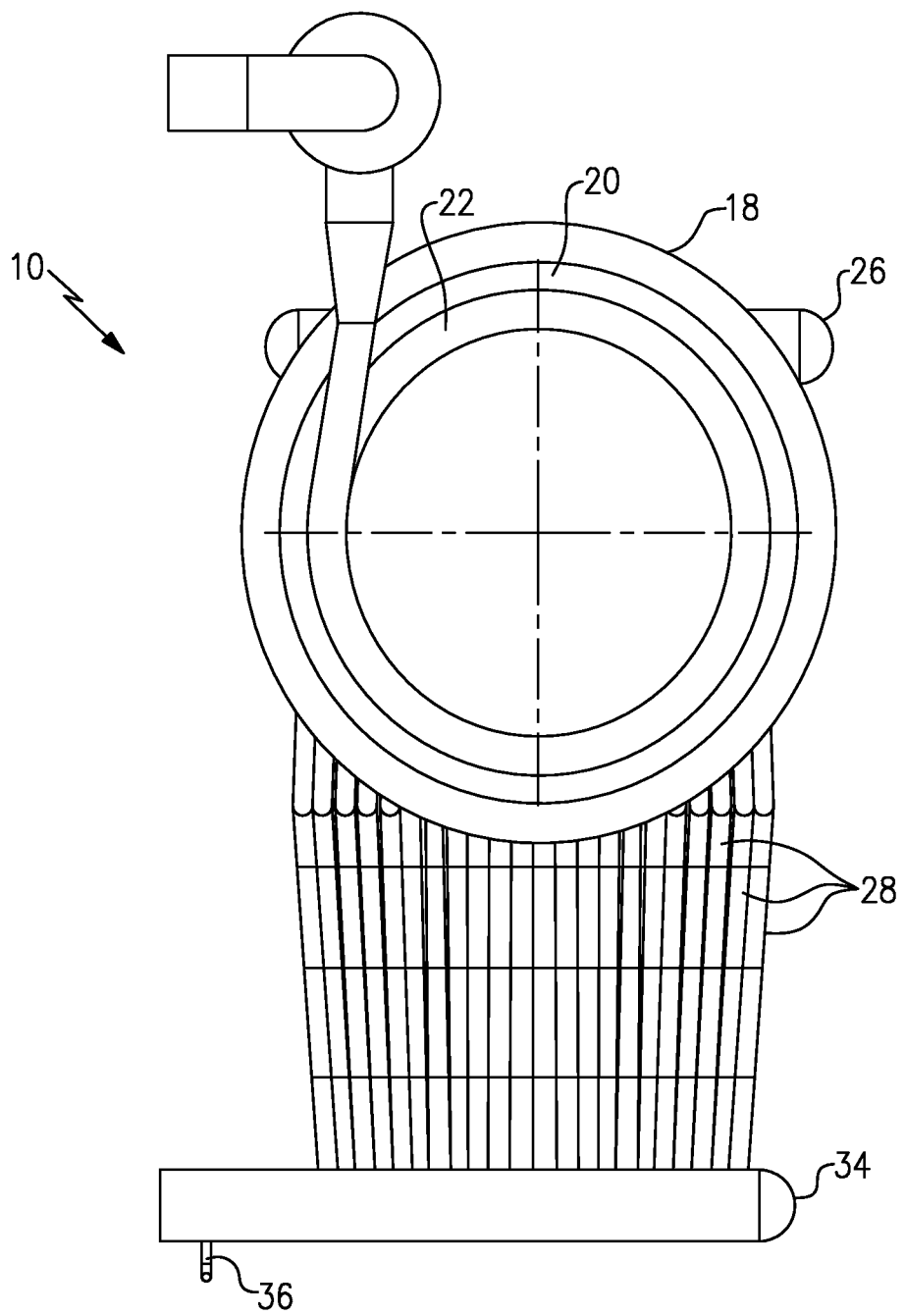
FIG. 3 is a front view of the structure shown in FIG. 2.

As shown in FIG. 2, an axial space, or gap, A exists between the end of the outermost spiral coil 18 and the end of the middle spiral coil 20 to allow exhaust gases E from the burner 12 (shown in FIG. 1) to pass axially between the outermost and middle spiral coils 18, 20. Similarly, an axial space B, which is larger than the axial space A, exists between the outermost spiral coil 18 and the innermost spiral coil 22. As illustrated, to provide the axial spaces A, B, the outermost spiral coil 18 is the axially longest of the spiral coils, and the innermost spiral coil 22 is the axially shortest of the spiral coils. Further, the ends of the spiral coils 18, 20, 22 adjacent the internal plates 40 are axially aligned.

Radial spaces, or gaps, C, D exist between the innermost and middle spiral coils 22, 20, and the middle and outermost spiral coils 20, 18, respectively. In one example, the radial spaces C, D are substantially equal. In another example, however, the radial spaces C, D may differ.

In general, relatively cool water is inlet through a water inlet 36, and passes to the condenser 16 via the lower manifold 34. The water next passes through the plurality of U-bend coils 28 to the combustion section 14 via the vertical pipes 32 and the upper manifold 26. The water passes through the combustion section 14, through the spiral coils 18, 20, 22 and ultimately to the outlet pipe 24 as water vapor, for example.

Water in the spiral coils 18, 20, 22 is heated by the exhaust E. Because of the arrangement of the spiral coils 18, 20, 22 (e.g., in particular the radial spaces C, D), the exhaust E is provided with a turbulent flow regime proximate spiral coils 18, 20, 22. Such turbulent flow is desirable, as it allows for efficient heat exchange between the exhaust E and the spiral coils 18, 20, 22. Further, the exhaust E of the burner 12 not only passes near the spiral coils 18, 20, 22 to heat the water therein, but it also passes to condenser 16, which is positioned below the combustion section 14, to transfer heat to the water contained in the U-bend coils 28. Therefore, water passing through the condenser 16 is "preheated" before reaching the combustion section 14.

The condenser 16 significantly raises the efficiency of the disclosed heat exchanger 10, as heat from the burner 12, which would otherwise have been wasted, is now recovered at the condenser 16. Water passing through the plurality of U-bend coils 28 is "preheated" by the exhaust E before it reaches the combustion section 14, thus reducing the overall load on the burner 12. Further, because heat from the exhaust E is absorbed at the condenser 16, the temperature of the exhaust E is relatively low when outlet from the heat exchanger 10 (e.g., at outlet 42).

Depending on design requirements, for example, an appropriate number of U-bend coils 28 could be selected for the condenser 16. If desired, the upper manifold 26 could be lowered closer to the end of the U-bend coils 28, in which case the upper manifold 26 could connect to the combustion section 14 at a lower point.

Although the different examples have the specific components shown in the illustrations, embodiments of this invention are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A heat exchanger, comprising: a burner;
a plurality of concentric spiral coils arranged about a common axis, wherein the outer diameters of each of the spiral coils are radially spaced apart from one another;
wherein each of the spiral coils has one end in axial alignment with that of the other spiral coils, and wherein each of the spiral coils has an opposite end axially spaced from that of the other spiral coils; and
an internal plate in axial alignment with the one end of the spiral coils;
wherein the spiral coils have the same tubing diameter;
wherein an outermost coil of the spiral coils is axially longer than the other spiral coils, and wherein an innermost coil of the spiral coils is axially shorter than the other spiral coils;
wherein a condenser section including a plurality of U-bend coils is positioned downstream of the spiral coils;
wherein the burner is positioned adjacent the opposite ends of the spiral coils, wherein there are three spiral coils, the spiral coils arranged to direct exhaust to the condenser section such that some of the exhaust from the burner flows to the condenser section through a first radial space between the innermost spiral coil and a middle spiral coil, wherein other of the exhaust from the burner flows to the condenser section though a second radial space between the middle spiral coil and the outermost spiral coil, wherein the exhaust flowing in the first radial space flows in parallel to the exhaust flowing in the second radial space such that exhaust exiting one of the first and second radial spaces flows to the condenser section without flowing through the other of the first and second radial spaces, and wherein the internal plate is arranged to direct exhaust interior to the innermost spiral coil to one of the first and second radial spaces; and
wherein a manifold fluidly couples the U-bend coils and the spiral coils.

2. The heat exchanger as recited in claim 1, wherein the heat exchanger is a water boiler.

3. A heat exchanger, comprising:
a burner;
a combustion section including a plurality of concentric spiral coils arranged about a common axis, wherein the outer diameters of each of the spirals coils are radially spaced apart from one another, wherein the spiral coils are arranged to provide a first passageway between an innermost spiral coil and a middle spiral coil, and wherein the spiral coils are further arranged to provide a second passageway between the middle spiral coil and an outermost spiral coil, wherein the first and second passageways are parallel to one another;
an internal plate provided adjacent an end of each of the spiral coils generally opposite the burner; and
a condenser section positioned below the combustion section such that exhaust from the burner passes through the spiral coils and to the condenser section, wherein the spiral coils are arranged such the innermost, middle, and outermost coils direct exhaust from the burner to the condenser section and such that (1) some exhaust from the burner enters the first passageway and flows to the condenser section without flowing through the second passageway and (2) other exhaust from the burner enters the second passageway and flows to the condenser section without flowing through the first passageway, and wherein the internal plate is arranged to direct exhaust interior to the innermost spiral coil to one of the first and second passageways; and
wherein the condenser section includes a plurality of U-bend coils,
wherein, the spiral coils and the U-bend coils provide a working fluid passage, the passage configured to route a working fluid from the U-bend coils to the spiral coils to heat the working fluid;
wherein the spiral coils have the same tubing diameter, and
wherein an outermost coil of the spiral coils is axially longer than the other spiral coils, and wherein an innermost coil of the spiral coils is axially shorter than the other spiral coils.

4. The heat exchanger as recited in claim 3, wherein the spiral coils and the U-bend coils are made of a stainless steel.

5. The heat exchanger as recited in claim 3, including a manifold fluidly coupling the U-bend coils and the spiral coils.

6. The heat exchanger as recited in claim 3, wherein the U-bend coils are spaced apart from one another.

7. The heat exchanger as recited in claim 3, wherein the U-bend coils are provided by 1 inch (2.54 cm) diameter tubes, and wherein the spiral coils are provided by 1.75 inch (4.45 cm) diameter tubes.

8. A method for heating a working fluid comprising:
providing (1) a burner, (2) a combustion section having a plurality of concentric spiral coils arranged about a common axis, wherein outer diameters of each of the spirals coils are radially spaced apart from one another, wherein the spiral coils are arranged to provide a first passageway between an innermost spiral coil and a middle spiral coil, and wherein the spiral coils are further arranged to provide a second passageway between the middle spiral coil and an outermost spiral coil, wherein the first and second passageways are parallel to one another, and wherein the combustion section includes an internal plate provided adjacent an end of each of the spiral coils generally opposite the burner, and (3) a condenser section having a plurality of U-bend coils, wherein the spiral coils are arranged such the innermost, middle, and outermost coils direct exhaust from the burner to the condenser section and such that (1) some exhaust from the burner enters the first passageway and flows to the condenser section without flowing through the second passageway and (2) other exhaust from the burner enters the second passageway and flows to the condenser section without flowing through the first passageway, and wherein the internal plate is arranged to direct exhaust interior to the innermost spiral coil to one of the first and second passageways, wherein the condenser section includes a plurality of U-bend coils, wherein the spiral coils and the U-bend coils provide a working fluid passage, the passage configured to route a working fluid from the U-bend coils to the spiral coils to heat the working fluid, wherein the spiral coils have the same tubing diameter, wherein an outermost coil of the spiral coils is axially longer than the other spiral coils, and wherein an innermost coil of the spiral coils is axially shorter than the other spiral coils; and establishing a flow of a working fluid within the U-bend coils and the spiral coils; and heating the working fluid with exhaust from the burner.

9. The method as recited in claim 8, wherein the working fluid flows from the U-bend coils to the spiral coils, such that the working fluid is preheated before entering the spiral coils.

10. The method as recited in claim 9, wherein the exhaust from the burner flows from the combustion section to the condenser section.

11. The method as recited in claim 8, wherein the working fluid is water.

12. The heat exchanger as recited in claim 1, wherein each of the spiral coils are provided within a common combustion section and are directly exposed to exhaust from the burner.

13. The heat exchanger as recited in claim 3, wherein:
each of the spiral coils has one end in axial alignment with that of the other spiral coils; and
each of the spiral coils has an opposite end axially spaced from that of the other spiral coils.

\* \* \* \* \*